(12) United States Patent
Raad et al.

(10) Patent No.: US 12,154,356 B2
(45) Date of Patent: Nov. 26, 2024

(54) AUTOMATED KEY-VALUE PAIR EXTRACTION

(71) Applicant: Alteryx, Inc., Irvine, CA (US)

(72) Inventors: Jad Dino Raad, Detroit, MI (US); Adam Blacke, Pinckney, MI (US)

(73) Assignee: Alteryx, Inc., Irvine, CA (US)

( * ) Notice: Subject to any disclaimer, the term of this patent is extended or adjusted under 35 U.S.C. 154(b) by 341 days.

(21) Appl. No.: 17/685,328

(22) Filed: Mar. 2, 2022

(65) Prior Publication Data

US 2023/0282013 A1 Sep. 7, 2023

(51) Int. Cl.
*G06V 30/18* (2022.01)
*G06V 30/41* (2022.01)

(52) U.S. Cl.
CPC ............. *G06V 30/18* (2022.01); *G06V 30/41* (2022.01)

(58) Field of Classification Search
CPC ...... G06V 30/18; G06V 30/41; G06V 30/153; G06V 30/412; G06V 30/414
See application file for complete search history.

(56) References Cited

U.S. PATENT DOCUMENTS

| | | | |
|---|---|---|---|
| 9,645,999 B1 | 5/2017 | Ciulla et al. | |
| 10,878,234 B1 * | 12/2020 | Adam | G06V 10/426 |
| 11,256,760 B1 * | 2/2022 | Corcoran | G06F 16/51 |
| 2010/0174732 A1 | 7/2010 | Levy et al. | |
| 2023/0133690 A1 * | 5/2023 | Gao | G06V 30/412 704/9 |

FOREIGN PATENT DOCUMENTS

CN 114005123 A 2/2022

OTHER PUBLICATIONS

PCT International Search Report and Written Opinion, PCT Application No. PCT/US 23/13970, May 30, 2023, 16 pages.

\* cited by examiner

*Primary Examiner* — Akwasi M Sarpong
*Assistant Examiner* — Michael L Burleson
(74) *Attorney, Agent, or Firm* — FIG. 1 Patents

(57) ABSTRACT

A document to be analyzed and a set of key names to be extracted from the document are received. A set of strings of characters contained within the document and a location for each string of character are identified. Moreover, a document graph for the document is generated. The document graph includes a set of nodes and a set of edges. Each node of the set of nodes corresponds to a string of characters of the set of strings of characters. Each edge of the set of edges connects two or more nodes together. Additionally, based on the document graph and the received set of key names, a set of keys are identified. Furthermore, a set of values are extracted from the document, and a set of key-value pairs are generated based on the identified set of keys and the extracted set of values.

20 Claims, 12 Drawing Sheets

FIG. 4B

Work Request

Weber und Lens AG

Number:EWR-001-1001  Revision: 1  Type:Change  Date:10.12.2011

Description: We need to reduce the weight of the
Carburetor by 10%

Urgency: processing required

Change kind: Functional improvement

Interchangeability: Upward only

Requesting person

Name: Hannah Keller  Company: Weber und Less AG

Mail address: Hannah.Keller@weberundless.com  Phone Number: +49-6143-71462-2213

Person in charge

Name: Alexander Koch  Company: Weber und Less AG

Mail address: Alexander.Koch@weberundless.com  Phone Number: +49-6143-71462-02

Released:◯  Rejected:◯  Signature:

Comments:

Affected Objects

| Item | Type | Number | Name | Version | Revision |
|---|---|---|---|---|---|
| 1 | 10035 | CARBURETOR | | 1 | 0 |

AUTOMATED KEY-VALUE PAIR EXTRACTION

BACKGROUND

Field of Art

The described embodiments pertain in general to data analytics, and in particular to extracting key-value pairs from documents.

Description of the Related Art

The growth of data analytic platforms, such as Big Data Analytics, has expanded data processing into a tool for processing large volumes of data to extract information having business value. For example, a small business may utilize a third-party data analytics environment employing dedicated computing and human resources to gather, process, and analyze vast amounts of data from various sources, such as external data providers, internal data sources (e.g., files on local computers), Big Data stores, and cloud-based data (e.g., social media information). Processing such large data sets, as used in data analytics, in a manner that extracts useful quantitative and qualitative information typically requires complex software tools implemented on powerful computer devices.

The data used in such data analytics platforms may come from a set of documents. Many documents contain associations between keys and values (for example, the "First Name" field on a tax form). These key-value pairs can be quite difficult for a computer to extract. For example, basic OCR extraction can lead to complex and laborious post-processing and text mining. Thus, there is a need for a tool which can extract key-value pairs from documents by providing only the names of the keys a user wishes to extract.

SUMMARY

The above and other issues are addressed by a computer-implemented method, computer system, and computer-readable storage medium for extracting key-value pairs from documents. An embodiment of the computer-implemented method includes receiving a document to be analyzed and a first set of keys to be extracted from the document. The method further includes identifying a set of strings of characters contained within the document, and a location for each string of characters. The method further includes generating a document graph. The document graph includes a set of nodes and a set of edges. Each node of the set of nodes corresponds to a string of characters of the set of strings of characters. Each edge of the set of edges connects two or more nodes together. The method further includes identifying a second set of keys based on the document graph and the received first set of keys. Moreover, the method includes extracting a set of values from the document. Finally, the method includes generating a set of key-value pairs based on the identified second set of keys and the extracted set of values.

An embodiment of the computer system includes a computer processor for executing computer program instructions. The system also includes a non-transitory computer-readable storage medium storing computer program instructions that when executed cause the computer processor to perform operations. The operations include receiving a document to be analyzed and a first set of keys to be extracted from the document. The operations further include identifying a set of strings of characters contained within the document, and a location for each string of characters. The operations further include generating a document graph. The document graph includes a set of nodes and a set of edges. Each node of the set of nodes corresponds to a string of characters of the set of strings of characters. Each edge of the set of edges connects two or more nodes together. The operations further include identifying a second set of keys based on the document graph and the received first set of keys. Moreover, the operations include extracting a set of values from the document. Finally, the operations include generating a set of key-value pairs based on the identified second set of keys and the extracted set of values.

An embodiment of the non-transitory computer-readable memory stores executable computer program instructions. The instructions are executable to perform operations. The operations include receiving a document to be analyzed and a first set of keys to be extracted from the document. The operations further include identifying a set of strings of characters contained within the document, and a location for each string of characters. The operations further include generating a document graph. The document graph includes a set of nodes and a set of edges. Each node of the set of nodes corresponds to a string of characters of the set of strings of characters. Each edge of the set of edges connects two or more nodes together. The operations further include identifying a second set of keys based on the document graph and the received first set of keys. Moreover, the operations include extracting a set of values from the document. Finally, the operations include generating a set of key-value pairs based on the identified second set of keys and the extracted set of values.

BRIEF DESCRIPTION OF DRAWINGS

FIG. 4B illustrates a marked up image of a document illustrating a representation of a document graph, according to one or more embodiments.

FIG. 4E illustrates a delined document generated by subtracting an image corresponding to horizontal and vertical lines in a document from the image of the document, according to one or more embodiments.

FIG. 4G illustrates a marked up image of a document illustrating bounding boxes with identified keys and values, according to one or more embodiments.

The figures depict various embodiments for purposes of illustration only. One skilled in the art will readily recognize from the following discussion that alternative embodiments of the structures and methods illustrated herein may be employed without departing from the principles of the embodiments described herein. Like reference numbers and designations in the various drawings indicate like elements.

DETAILED DESCRIPTION

Figure 1:
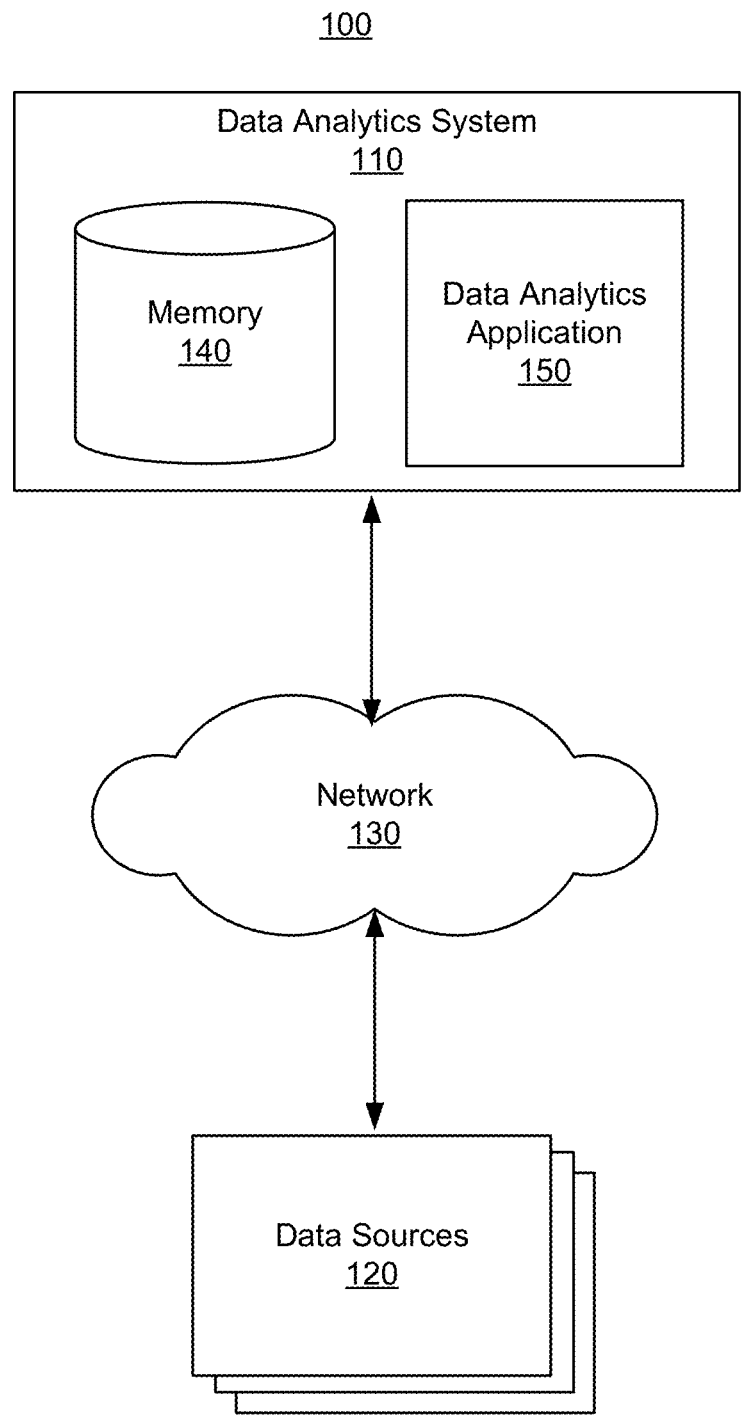
FIG. 1 is a block diagram illustrating a data analytics environment including a data analytics system, according to one or more embodiments.

FIG. 1 is a block diagram illustrating a data analytics environment 100 including a data analytics system 110 according to one embodiment. The environment 100 further includes multiple data sources 120 connected to the data analytics system 110 via a network 130. Although the illustrated environment 100 contains only one data analytics system 110 coupled to multiple data sources 120, embodiments can have multiple data analytics systems and a singular data source. Moreover, even though the data sources 120 are shown as being connected to the data analytics system 110 via a network, one or more data sources may be stored locally at the data analytics system. Alternatively, users may provide data to the data analytics system directly (either through the network 130 or through a local interface of the data analytics system).

The data analytics system 110 is a computer-based system utilized for processing large amounts of data. In some embodiments, the data are collected, gathered, or otherwise accessed from the multiple data sources 120 via the network 130. The data analytics system 110 can implement scalable software tools and hardware resources employed in data processing tasks from a wide variety of data sources. A data processing task (also referred to as a task or data analytics task) is a computing operation for processing data. A data processing task includes, e.g., accessing data, preparing data, blending data, packaging data, analyzing data, other types of operations on data, or some combination thereof. The data analytics system 110 can perform multiple tasks in parallel. When it has computer resources (e.g., memory) available, the data analytics system 110 can pick a task to perform from a plurality of tasks that are ready to be performed.

In the embodiment of FIG. 1, the data analytics system 110 includes a memory 140 and a data analytics application 150. The memory 140 stores data used in data analytic operations and provides access to data storage area(s). In some embodiments, the memory 140 includes random access memory (RAM), hard disk drive (HDD), solid-state drive (SSD), other forms of computer memory, or some combination thereof. In some embodiments, the memory 140 includes a primary memory 140 providing relatively fast access to a relatively small data storage area and a secondary memory 150 providing relatively slow access to a relatively large data storage area.

Figure 2:
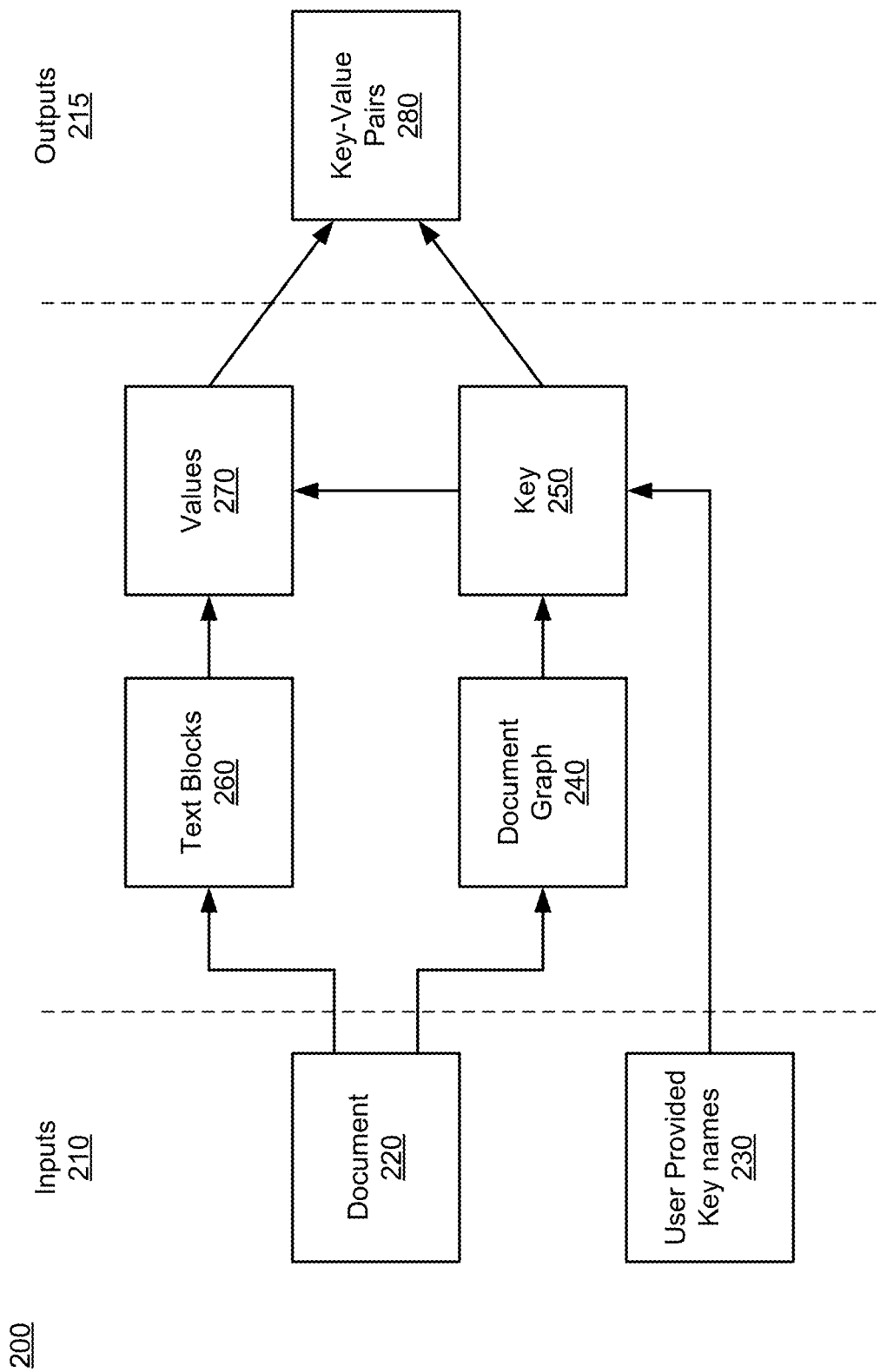
FIG. 2 is a block diagram illustrating a workflow to extract key-value pairs from a document, according to one or more embodiments.

The data analytics application 150 is a software application supporting execution of data analytics tasks by using analytics workflows (also referred to as "workflows"), such as the workflow illustrated in FIG. 2. A workflow is a sequence of data analytics tools (also referred to as "tools") or data analytics modules (also referred to as "modules"), through which a data analytics task passes from initiation (e.g., input of a data file) to completion (e.g., output of an outcome of the task). Each tool in the sequence performs a specific processing operation or data analytics function, such as input, output, preparation, join, predictive, spatial, investigation, parse, transform, and so on. Execution of the workflow includes operations of the tools in the workflow and generates a result item representing the outcome of the task. The result item, in one example, is a chart that provides a visual representation of the outcome of the task.

The data analytics application 150 provides an environment that facilitates creation of workflows. For instance, the data analytics application 150 provides a visual workflow environment supported by a GUI of the data analytics application 150. The visual workflow environment enables a set of drag and drop tools that eliminate the need for providing software code to design a workflow and eliminate the need to identify complex formulas to be implemented by a workflow. In another embodiment, the workflow 200 is created and described in a document, such as an extensible markup language (XML) document.

The environment may also facilitate creation of logic-controlled workflows, such as the workflow illustrated in FIG. 2. A logic-controlled workflow is a workflow that includes a sequence of tools integrated with one or more logic controllers. A logic controller has a logical function and is adapted to determine whether to (and/or not to) trigger a tool or module based on an input. The data analytics application 150 uses the sequence of tools to process data files and uses the logic controllers to control operations of tools in the sequence during the processing of the data files. In some embodiments, a logic controller is associated with at least two tools in the workflow: a first tool and a second tool subsequent to the first tool in the sequence. The data analytics application 150 applies a logging function onto the first tool to log events occurring during the performance of the data analytics function of the first tool in the processing of the data file. The log data generated by the first tool describe activities performed and/or events detected by the first tool during its processing of the data file. The events may be, e.g., errors detected during the performance of the data analytics function of the tool, warning generated during the performance of the data analytics function of the tool, number of records processed by the tool, output of the metadata file, completion of the performance of the data analytics function of the tool, and so on. The first tool also outputs analytics data, e.g., in a metadata file. The analytics data are generated by the first tool from the performance of its data analytics function in the processing of the data file.

The data analytics application 150 uses the log data and/or analytics data generated by the first tool as input for the logic controller. For instance, the logic controller can analyze the log data to detect an event described by the log data and to determine whether to trigger the second tool based on the detected event. In some embodiments, the logic controller is a data analytics tool with a logical function. The tool in the logic controller performs a data analytics function on the log to detect the events logged by the first tool. The logical function outputs a command based on the output of the tool in the logic controller. The second tool is adapted to receive the command and to process data in accordance with the command.

For example, in response to detecting a successful completion of the data analytics function of the first tool, the logic controller triggers the second tool to operate. In some embodiments, the logic controller receives the metadata file from the first tool and sends the metadata file to the second tool in response to a determination of triggering the second tool. The second tool, receiving the metadata file from the logic controller, process the metadata file. The logic controller may selectively execute other tools in the workflow based on the log generated by the first tool. Tools subsequent to the second tool, if any, also operate to perform their data analytics functions and to finish the processing of the data file. A result item representing an outcome of the processing of the data file by the sequence of tools is generated. The data analytics application 150 provides the result item for display to a user.

As another example, the logic controller does not trigger the operation of the second tool in response to detecting an error that occurred during the operation of the first tool. In some embodiments, in response to determining not to trigger the operation of the second tool, the logic controller triggers an operation of a third tool. The third tool may not be in the sequence. The third tool is adapted to generate a supplemental result item. In one example, the supplemental result item is a message specifying an event that occurred during the operation of the first tool, based on which the logic controller has determined not to trigger the data analytics function of the second tool. The third tool generates the message based on information of the event from the logic controller and can send the message to a client device associated with the user. In some embodiments, the data analytics application 150 receives from the user an action to address the event. The data analytics application 150 may resolve the event based on the user's action. In response to resolving the user's action, the data analytics application 150 may instruct the logic controller to trigger the second tool to finish the processing of the data file.

The examples are provided for the purpose of illustration. The logic controller can detect other types of logged events. Also, the logic controller can control execution of other tools. For example, the logic controller may determine to (or not to) trigger one or more other tools in addition to determining to trigger the second tool. The one or more other tools may be connected to the second tool, e.g., in the same order as they are arranged in the sequence of tools. Similarly, the logic controller may determine to (or not to) trigger one or more other tools in addition to determining not to trigger the second tool. Further, the logic controller can receive log generated by one or more other tools in addition to the first tool as input and use the input.

The logic-controlled workflow generated by the data analytics application 150 is advantageous as it allows users to monitor and control the data analytics process. By using such logic-controlled workflow, the data analytics process can be paused at the first tool after a negative event (i.e., an event based on which the logic controller determines not to trigger the second tool). The negative event can cause the data generated by the first tool to be improper for further processing. For instance, the first tool can stop processing the data file when an error occurs so that the data generated by the first tool is incomplete. Thus, the pause of the data analytics process avoids wasting computing resources to process the improper data by the other tools. Also, users can add the third tool to the workflow so that they can be informed of the negative event through the supplemental result item. This way, the users get a chance to resolve the negative event and resume the data analytics process. Compared with conventional data analytics technologies, the logic-controlled workflow facilitates user contributions to data analytics processes and saves computing resources that would have been wasted on processing improper data.

In some cases, the data analytics application 150 provides software that supports networked, or cloud-based, access to data analytic tools and macros to multiple end users. As an example, the data analytics application 150 supports creation of workflows in a manner of dashboard, web application, mobile application, etc. As another example, the data analytics application 150 allows users to share, browse and consume analytics in a manner similar to a mobile application store or other cloud-based service. Analytic data, macros and workflows can be packaged and executed as a smaller scale and customizable analytic application (i.e., an app), for example, that can be accessed by other users of the data analytics system 110. In some cases, access to published analytic apps can be managed by the data analytics system 110, namely granting or revoking access, and thereby providing access control and security capabilities. The data analytics application 150 can perform functions associated with analytic apps such as creating, deploying, publishing, iterating, updating and the like.

Additionally, the data analytics application 150 can support functions performed at various stages involved in data analytics, such as the ability to access, prepare, blend, analyze, and output analytic results. In some cases, the data analytics application 150 can access the various data sources, retrieving raw data, for example, in a stream of data. Data streams collected by the data analytics application 150 can include multiple records of raw data, where the raw data is in differing formats and structures. After receiving at least one data stream, the data analytics application 150 can perform operations to allow records of the data stream to be used as an input into data analytic operations. Moreover, analytic functions involved in statistical, qualitative, or quantitative processing of records, such as predictive analytics (e.g., predictive modelling, clustering, data investigation) can be implemented by data analytics application 150.

As mentioned above, the data sources 120 provide electronic data to the data analytics system 110. A data source 120 may be a computer, a database, a network API (application programming interface), or a cloud storage system. A data source 120 may also be a computer system that can retrieve data from another source. The data sources 120 may be remote from the data analytics system 110 and provide the data via the network 130. In addition, some or all data sources 120 may be directly coupled to the data analytics system and provide the data without passing the data through the network 130. The data provided the data sources 120 is typically organized into data records, which each data record including one or more values. For example, a data record provided by a data source may include a series of comma-separated values. The data describes information of relevance to an enterprise using the data analytics system. For example, data from a data source 120 can describe computer-based interactions (e.g., click tracking data) with content accessible on websites and/or with social media applications.

The network 130 represents the communication pathways between the data analytics system 110 and the data sources 120. In one embodiment, the network 130 is the Internet and uses standard communications technologies and/or protocols. The data exchanged over the network 130 can be represented using technologies and/or formats including the hypertext markup language (HTML), the extensible markup language (XML), etc. In another embodiment, the entities can use custom and/or dedicated data communications technologies instead of, or in addition to, the ones described above.

FIG. 2 is a block diagram illustrating a workflow 200 performed using the data analytics system 110 to process data according to one embodiment. The workflow 200 is executed by a computer device of the data analytics system 110. However, in other embodiments, the workflow 200 is deployed to another computer device that may be communicatively connected, via a network (e.g., the network 130), to the data analytics system 110.

As illustrated, the workflow 200 of FIG. 2 includes receiving a set of inputs 210, and generating and/or presenting a set of outputs 215. In some embodiments, the set of inputs are received (either from the user of the data analytics system 110, by another process interacting with the data analytics system 110, from a storage device, or the like) using a set of input tools. Moreover, the set of outputs may be presented to a user of data analytics system 110 through a browsing tool.

The data analytics tool 110 receives as inputs a document 220 and a set of user provided key names 230. In some embodiments, the document is received in a specified document format (e.g., a portable document format (PDF)). The data analytics tool 110 then extracts a set of key-value pairs 280 from the documents 220 based on the set of user provided key names 230.

In some embodiments, to extract the set of key value pairs 280, the data analytics system 110 generates a document graph 240 by analyzing the received document 220. The document graph 240 may include a set of nodes and a set of edges. Each node of the set of nodes may correspond to a string of characters identified in the document 220. In some embodiment, each node stores its corresponding string of characters and an associated location where the string of characters is located within the document 220. Moreover, each edge of the set of edges connects two or more nodes to each other.

In addition, based on the generated document graph 240 and the set of user provided key names 230, the data analytics system 110 identifies a set of keys 250 within the document. In some embodiments, the data analytics system 110 searches the document graph 240 to locate each of the user provided key names 230 within the document graph 240. The data analytics tool may additionally extract the location of each key 250 within the document from the document graph 240.

The data analytics system 110 identifies a set of text blocks 260 within the document 220, and extracts a set of values 270 from the document based on the identified set of text blocks 260 and the set of identified keys 250. The data analytics system 110 then matches a key from the set of identified keys 250 and a corresponding value from the set of identified values 270 to generate the set of key-value pairs 280.

Figure 3:
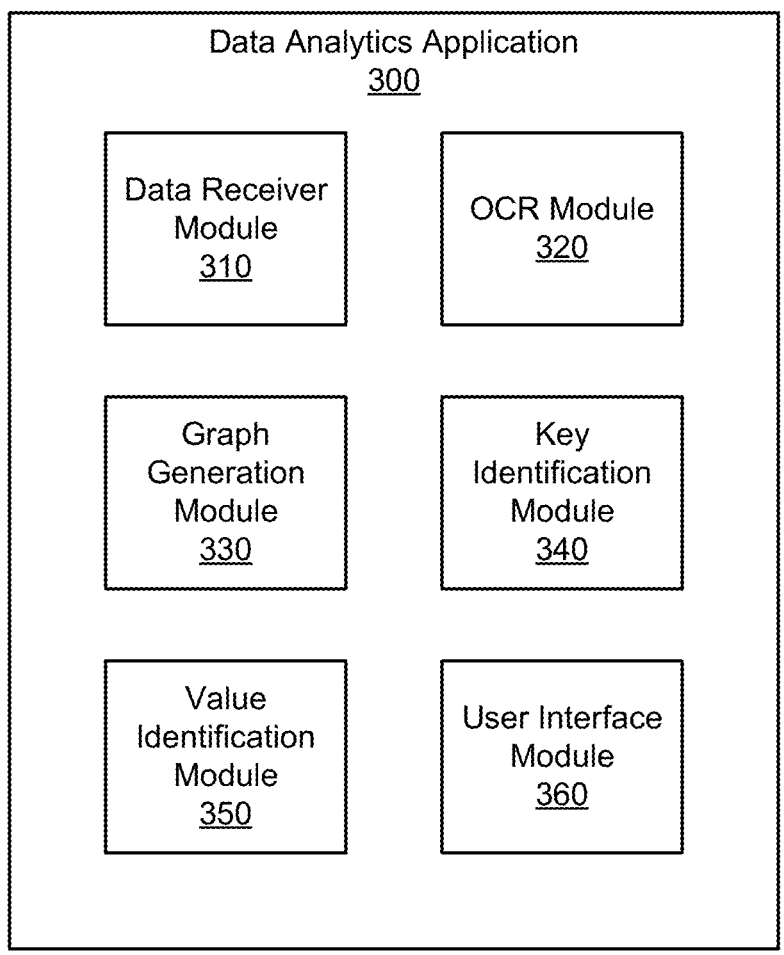
FIG. 3 is a block diagram illustrating a data analytics application, according to one or more embodiments.

FIG. 3 is a block diagram illustrating a data analytics application 300 according to one or more embodiments. The data analytics application 300 is an embodiment of the data analytics application 150 in FIG. 1. In the embodiment of FIG. 3, the data analytics application 300 includes a data receiver module 310, an optical character recognition (OCR) module 320, a graph generation module 330, a key identification module 340, a value identification module 350, and a user interface module 360. Those of skill in the art will recognize that other embodiments can have different and/or other components than the ones described here, and that the functionalities can be distributed among the components in a different manner. For instance, some or all functions of the data analytics application 300 may be performed at a client device or a third-party server.

The data receiver module 310 receives data files from data sources, e.g., the data sources 120, and provides the data files to other modules in the data analytics application 300.

In one embodiment, the data receiver module 310 serves as the interface between the modules in the data analytics application. In another embodiment, the data receiver module 310 is absent and the function of the data receiver module 310 is performed by each of the modules of the data analytics application.

In some embodiments, the data receiver module 310 is configured to receive a document 220 to be analyzed and a set of parameters for analyzing the document. The set of parameters for analyzing the document may include a set of user provided key names 230 for extracting key-value pairs 280 from the document 220. In some embodiments, the data received module 310 is configured to receive documents having a predefined format (such as a PDF format). The data receiver module 310 may be configured to identify if the document 220 has the correct format, and may output an error if the document does not have the predefined format.

The OCR module 320 analyzes a document 220 and identifies strings of characters that are included in the document 220. In some embodiments, the OCR module 320 additionally determines a location or coordinates for each of the identified string of characters. The location or coordinate of a sting of characters may correspond to a centroid of a bounding box around the string of characters within the document 220. In some embodiments, the OCR module 320 receives as an input an image of a document (or one or more images corresponding to pages of a document). The OCR module 320 may preprocess the input image prior to increase a likelihood of correctly detecting the strings of characters contained within the input image. For example, the OCR module may convert an image to a predetermined resolution (e.g., at 300 dots per inch (dpi)), converts the image to grayscale, performs adaptive Gaussian thresholding, dilation, erosion, median blur, and simple thresholding.

Figure 4A:
FIG. 4A illustrates a marked up image of a document illustrating the output of the OCR module, according to one or more embodiments.

FIG. 4A illustrates a marked up image of a document illustrating the output of the OCR module, according to one or more embodiments. As shown in FIG. 4A, the OCR module identifies regions of a document that contains strings of characters and recognizes the characters in the string of characters. In the example of FIG. 4A, each string of character is surrounded by a box.

Referring back to FIG. 3, the graph generation module 330 generates a document graph 240 for a document 220 from the output of the OCR module 320. Specifically, the document graph 240 generated by the graph generation module 330 based on the output of the OCR module 320 includes a set of nodes interconnected by a set of edges. In some embodiments, the graph generation module 330 adds a node for each string of characters identified from the document by the OCR module 320. In some embodiment, each node stores its corresponding string of characters and an associated location where the string of characters is located within the document.

In some embodiments, for each node in the document graph 240, the graph generation module 330 identifies a set of neighboring nodes to be connected to the node. The graph generation model 330 may add edges to connect the node with a neighboring node if the neighboring node is within a threshold distance from the node. In some embodiments, the model generation model 330 adds edges to connect the node with a neighboring node if the neighboring node is within the threshold distance from the node and the location of the node and the location of the neighboring node are within an angle range of each other.

Figure 4B:
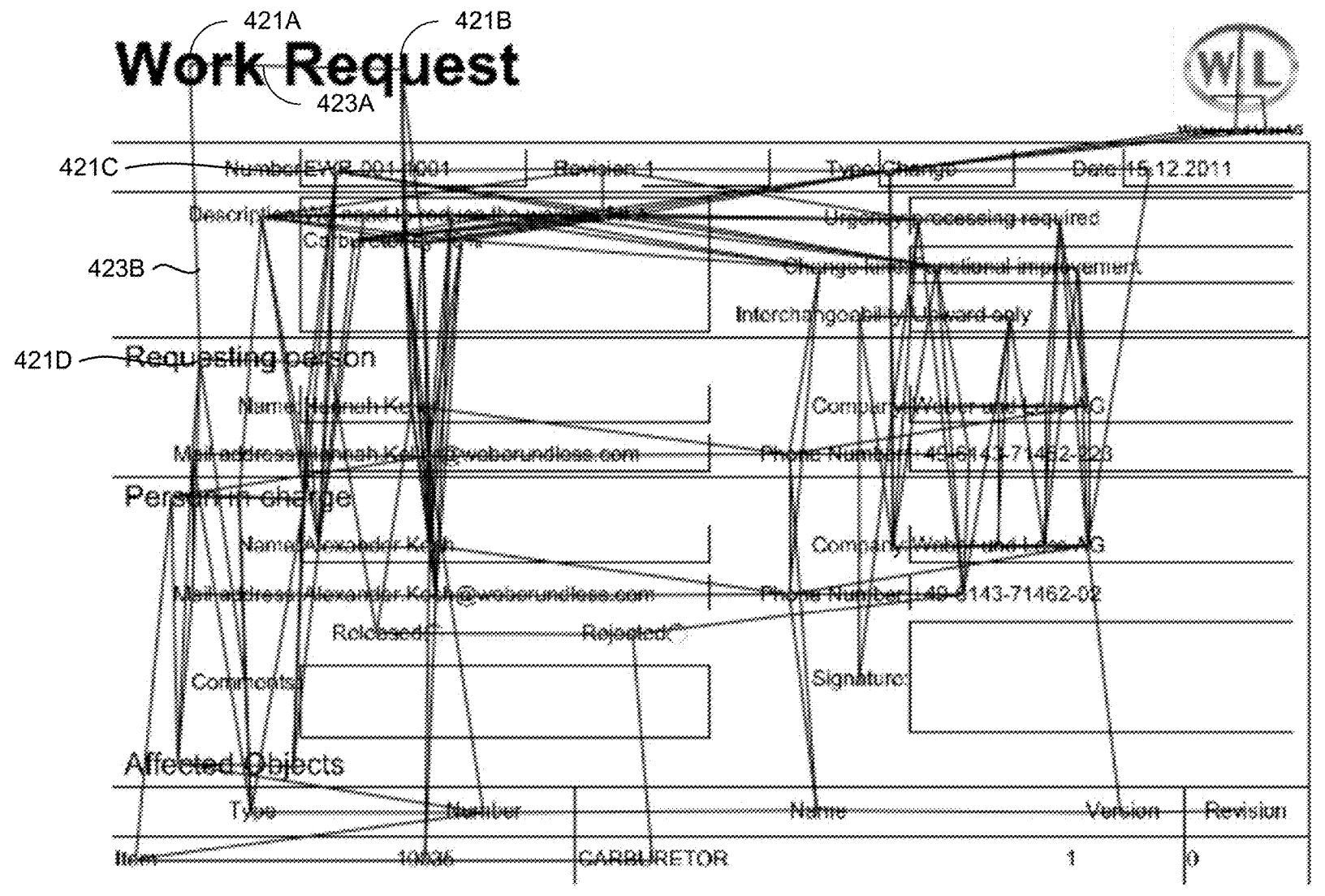

FIG. 4B illustrates a marked up image of a document illustrating the output of the graph generation module, according to one or more embodiments. In the example of FIG. 4B, each string of characters identified by the OCR module 320 in the image of the document shown in FIG. 4A is assigned to a node 421 in the document graph. Moreover, each node 421 is connected to one or more nodes by edges 423. For example, node 421A corresponding to the string of characters "Work" is connected to the node 421B corresponding to the string of characters "Request" 421B by edge 423A. The graph generation module 330 may connect node 421A to node 421B in response to determining that node 421B is within a threshold distance from node 421A and within a threshold angle from node 421A. Similarly, node 421A is connected to node 421D corresponding to the string of characters "Requesting" by edge 423B. However, node 421A is not connected to node 421C corresponding to the string of characters "NumberEWR-001-1001." In the example of FIG. 4B, node 421A is not connected to node 421C because node 421C is not within the threshold angle from node 421A.

Referring back to FIG. 3, the key identification module 340 identifies a set of keys 250 from the document 220 to form the set of key-value pairs 280 to be extracted from the document. The key identification module 340 receives a set of user provided key names 230 and traverses the document graph 240 to locate the user provided key names 230 within the document 220.

In some embodiments, for each user provided key name, the key identification module 340 determines whether the user provided key name include multiple words. If the user provided key name includes multiple words, the key identification module splits the user provided key name into a set of words (or a set of tokens). The key identification module 340 may then identify one or more chains of nodes corresponding to the set of words of the user provided key name by searching for the user provided key name by searching the first word of the user provided key name within the document graph 240, and traversing the document graph to identify the subsequent words of the user provided key name. That is, the key identification module 340 may identify a set of nodes that match the first word of the user provided key name by comparing each string of nodes identified by the OCR module 320 to the first word of the user provided key name. For each identified node matching the first words of the user provided key, the key identification module 340 determines if a second node connected to the identified node through an edge matches the second word of the user provided key name. If the identified node does is not connected to a second node that matches the second word of the user provided key name, the key identification module 340 determines that the identified node does not correspond to the user provided key name. Alternatively, if the identified node does have a second node that matches the second word of the user provided key name, the key identification module 340 keeps the identified node as a candidate key corresponding to the user provided key name. If the user provided key name included additional words, the key identification module 340 keeps traversing the document graph until every word of the user provided key name has been found. For example, if the user provided key name includes a third word, the key identification module 340 determines if a third node connected to the second node through an edge matches the third word of the user provided key name, and so forth.

In some embodiments, a chain of nodes (i.e., a set of nodes connected through a set of edges) match the user provided key name, the key identification module 340 may merge the nodes in the chain of nodes into a single node. The key identification module 340 may additionally determine a new location for the merged node. The key identification module 340 may then replace the nodes in the chain of nodes with the merged node.

In some embodiments, the key identification module 340 uses fuzzy matching to determine whether a word matches a node in the document graph. For example, the key identification may compare the word with the string of characters corresponding to the node and may determine a Levenshtein ratio (LR) based on the comparison. If the LR is above a threshold value (e.g., 90%), the key identification module 340 determines that the word matches the string of characters corresponding to the node. Alternatively, the key identification module 340 selects a top set number of nodes (e.g., top 10 nodes) having the highest LR values for the word being considered.

Figure 4C:
FIG. 4C illustrates a marked up image of a document illustrating the output of the key identification module, according to one or more embodiments.

FIG. 4C illustrates a marked up image of a document illustrating the output of the key identification module, according to one or more embodiments. Specifically, FIG. 4C illustrates a set of keys identified by the key identification module. Each of the keys identified by the key identification module is surrounded by a box.

Referring back to FIG. 3, the value identification module 350 identifies a set of values 270 from the document 220 to form the set of key-value pairs 280 to be extracted from the document. They value identification module 350 identifies text blocks 260 (i.e., blocks of text) from the document 220 and matches the text blocks 260 to the keys 250 identified by the key identification module 340. The value identification module 350 then extracts values from the text blocks 260.

In some embodiments, the value identification module 350 delines the document. For example, the value identification module 350 removes horizontal and vertical lines from an image of the document (or from images corresponding to each page of the document). To deline the document, a kernel is applied to an image of the document to generate an image corresponding to the horizontal and vertical lines. In some embodiments, the kernel is determined by the size of the document. Moreover, in some embodiments, a first kernel is applied to generate a first image corresponding to horizontal lines, and a second kernel is applied to generate a second image corresponding to vertical lines. The generated image (or images) corresponding to the horizontal and vertical lines is subtracted from the image of the document to generate the delined image of the document.

Figure 4D:
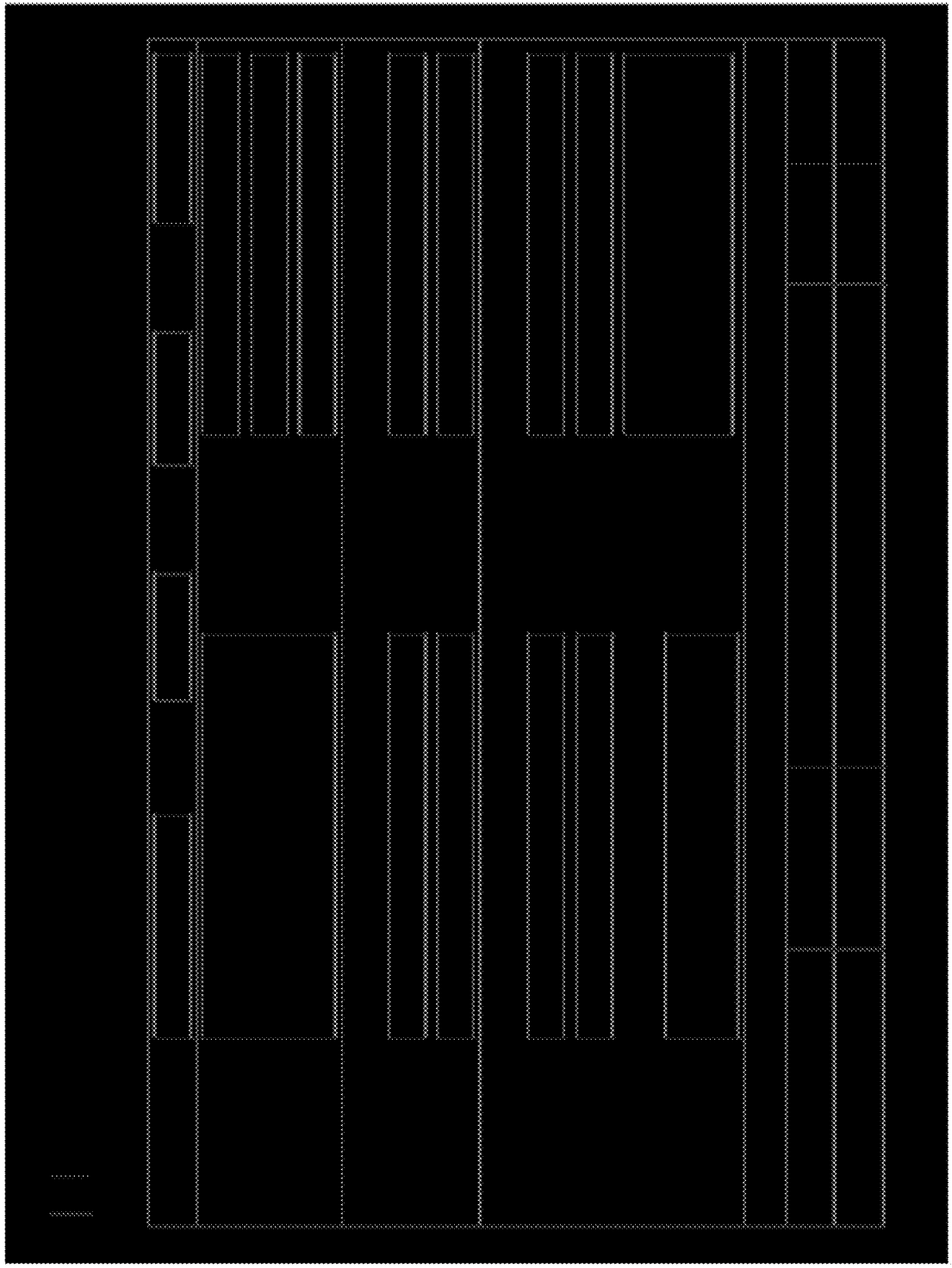
FIG. 4D illustrates an image corresponding to horizontal and vertical lines generated by applying a kernel to the image of a document, according to one or more embodiments.

FIG. 4D illustrates an image corresponding to the horizontal and vertical lines generated by applying a kernel to the image of a document, according to one or more embodiments. FIG. 4E illustrates a delined document generated by subtracting an image corresponding to horizontal and vertical lines in a document from the image of the document, according to one or more embodiments.

The delined image of the document is then processed to generate a set of bounding boxes. In some embodiments, a Run Length Smearing Algorithm (RLSA) is applied to the delined image to generate the bounding boxes. In some embodiments, the RLSA identifies a set of foreground pixels (e.g., filled or black pixels) and a set of background pixels (e.g., blank or white pixels). The RLSA then converts background pixels to foreground pixels based on the proximity of the background pixel to foreground pixels. In some embodiments, the RLSA converts background pixels to foreground pixels if the background pixel is within a set number of pixels from foreground pixels in both directions on the horizontal axis of the delined image.

In some embodiments, the RLSA converts background pixels having a number of adjacent background pixels lower than a threshold limit value. In some embodiments, the RLSA represents background pixels of a document as zeros, and represents foreground pixels of the document as ones. Then, for each zero in the representation of the document, the RLSA replaces the zero with a one if the adjacent number of zeros is less than the threshold limit value. For instance, if the threshold limit value is 3, a portion of a document having a representation of 1000111000001 is converted to a representation of 1111111000001. In some embodiments, the RLSA is applied in a horizontal direction. In other embodiments, the RLSA is applied in both the horizontal direction and the vertical direction.

After running the RLSA, the value identification module 350 executes a contour detection algorithm to generate bounding boxes around blocks of text that are associated together. The contour detection algorithm identifies bounding boxes for the pixels classified as foreground pixels after the RLSA was applied. In some embodiments, the value identification module executes the contour detection algorithm on the bounding boxes to merge adjacent boxes together. For example, the value identification module 350 may convert all the pixels surrounded by a bounding box as foreground pixels and re-applies the contour detection algorithm to detect bounding boxes for the pixels classified as foreground pixels after the first contour detection algorithm was applied.

Figure 4F:
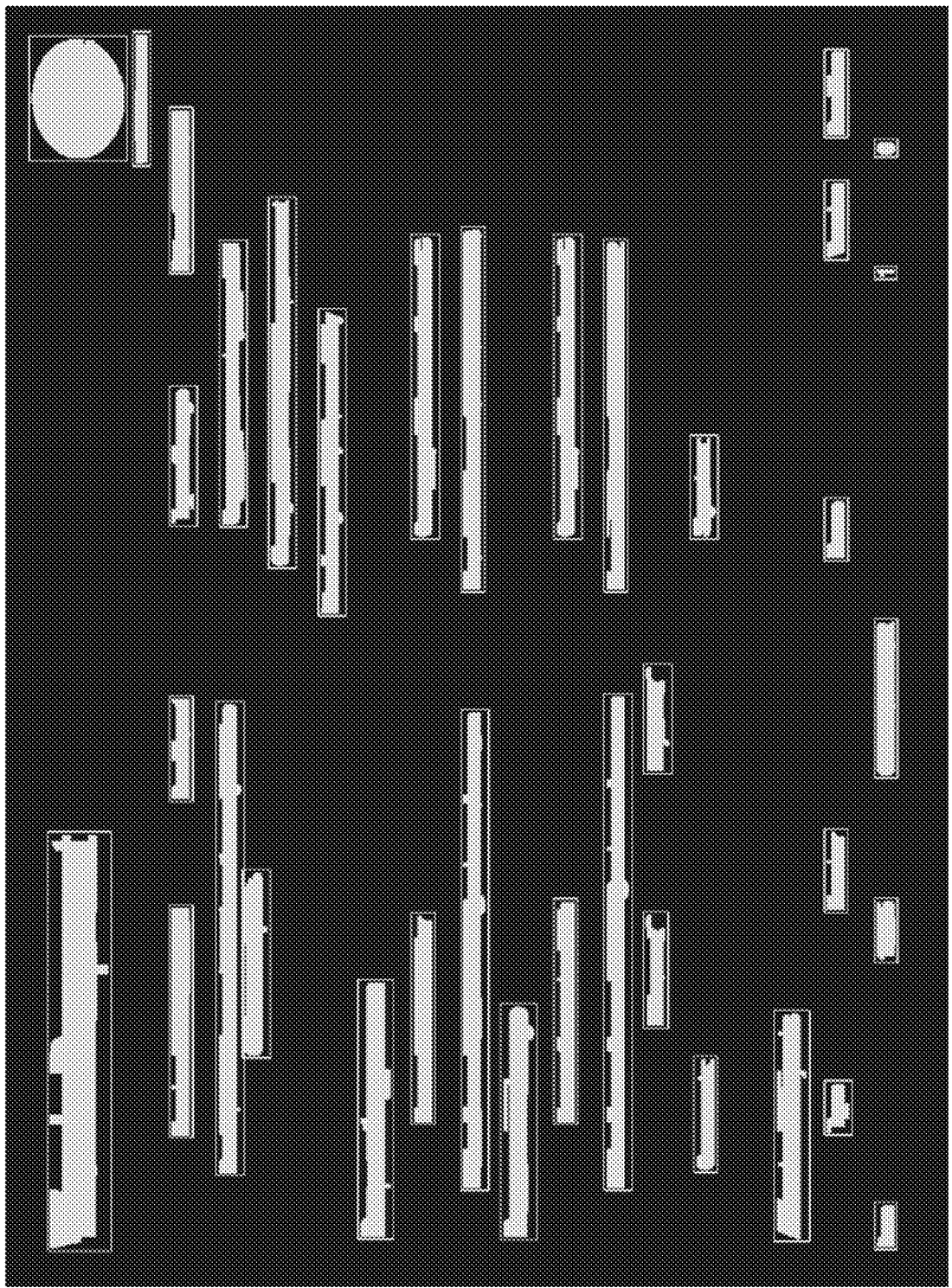
FIG. 4F illustrates a marked up image of a document illustrating bounding boxes generated by the value identification module, according to one or more embodiments.

FIG. 4F illustrates a marked up image of a document illustrating the bounding boxes generated by the value identification module, according to one or more embodiments. Specifically, FIG. 4F illustrates a set of foreground pixels as identified by the RLSA and a set of bounding boxes, each surrounding one blob of foreground pixels.

Using the bounding boxes, the value identification module 350 then identifies one or more values for each key identified by the key identification module 340. In some embodiments, for each key identified by the key identification module 340, the value identification module 350 identifies one value by identifying a bounding box based on the location of the key and extracting the text surrounded by the identified bounding box.

In some embodiments, for a given key, the value identification module 350 identifies a bounding box that surrounds the key. Alternatively, the value identification module 350 identifies the bounding box that is the closest to the key. In some embodiments, the value identification module 350 traverses the document graph to identify a bounding box to associate the key with. In some embodiments, the value identification module 350 determines whether any given bounding box is the closest bounding box to multiple keys. If the value identification module 350 determines that a bounding box is the closest bounding box to multiple keys, the value identification module 350 splits the bounding box and associates each key to a portion of the bounding box.

Alternatively, in some embodiments, the value identification module 350, instead of processing each key to identify bounding boxes to be associated with the key, the value identification module 350 processes each bounding box to identify whether to associate the bounding box with one or more keys. For instance, for each bounding box, the value identification module 350 may identify the keys that are surrounded by the bounding box. In this embodiment, the value identification module 350 may consider three different scenarios. First, a bounding box may contain one key and an associated value. Second a bounding box may contain multiple keys and associated values. Third, a bounding box may contain values and no keys.

If the value identification module 350 determines that a bounding box contains one key, the value identification module 350 extracts the value from the bounding box and generates a key value pair based on the key and the extracted value. For instance, the value may be extracted by removing the text of the key from the text surrounded by the bounding box.

Moreover, if the value identification module 350 determines that a bounding box contains multiple keys, the value identification module 350 splits the bounding box based on the number of keys that are surrounded by the bounding box. In some embodiments, the value identification module 350 splits the bounding box by attempting to optimize the boundaries between keys and values. For example, if the bounding box includes n keys stacked in a column, the value identification module 350 splits the bounding box horizontally into n smaller bounding boxes, each containing one key and one value. The value identification module 350 then applies the steps corresponding to the case where a bounding box contains one key and an associated value to each of the bounding boxes obtained by splitting a bounding box that included multiple keys.

Additionally, if the value identification module 350 determines that a bounding box does not contain a key, the value identification module uses the document graph to associate the bounding box to a key.

Figure 4G:
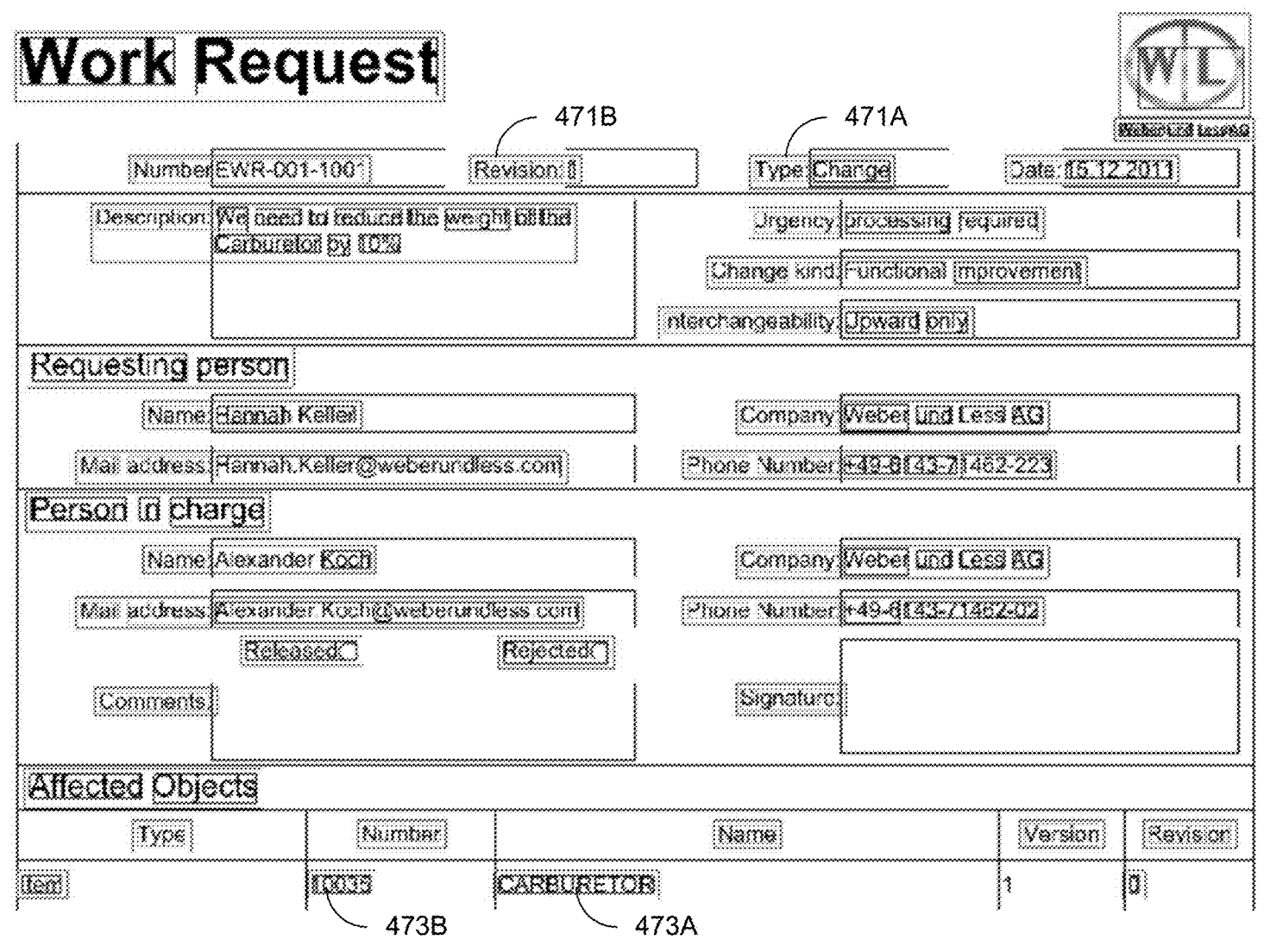

FIG. 4G illustrates a marked up image of a document illustrating bounding boxes with identified keys and values, according to one or more embodiments. In the example of FIG. 4G, the document includes a set of bounding boxes 471 that includes one key and one value. For example, bounding box 471A includes the key "Type" and the value "Change." When processing bounding box 471A, the value identification module determines that only one key is surrounded by the bounding box 471A and extracts the value from the bounding box to generate a key-value pair for the key located inside the bounding box. For example, the value identification module extracts the value from the bounding box by removing the key from the strings of characters located inside the bounding box 471A. Moreover, in the example of FIG. 4G, the document includes a set of bounding boxes 473 that includes a value but no key. For example, bounding box 473A include the value "CARBURETOR" but does not include a key. Here, the value identification module may identify the key that is located the closest to the value and associated the identified key with the value bounded by the bounding box. In this case, the value identification module identifies that the key "Name" is the closest to the bounding box 473A and generates a key-value pair by associating the key "Name" with the value "CARBURETOR."

Figure 5:
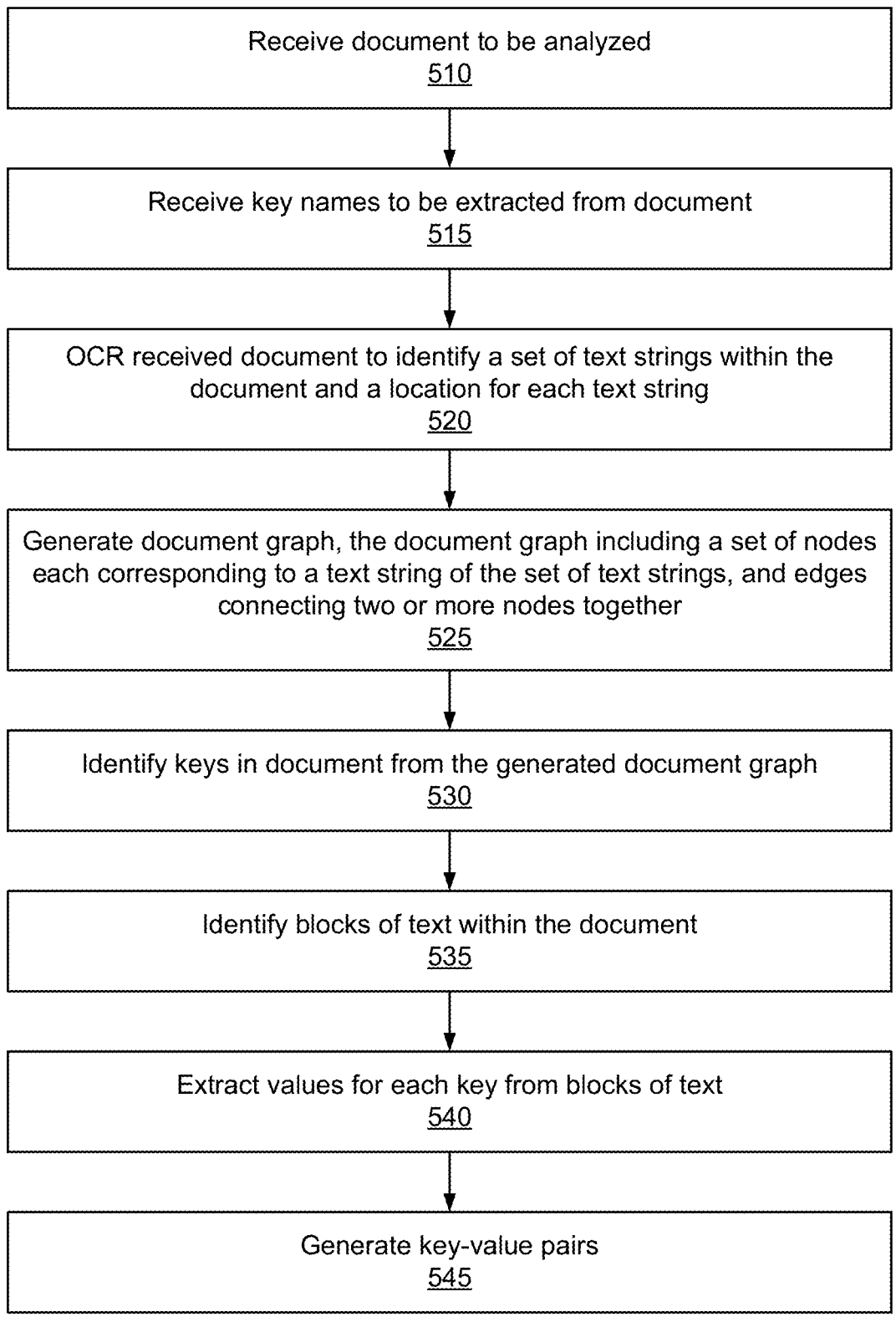
FIG. 5 is a flow chart illustrating a process for extracting key-value pairs by using an analytics workflow, according to one or more embodiments.

FIG. 5 is a flow chart illustrating a process for extracting key-value pairs by using an analytics workflow, according to one or more embodiments. In some embodiments, the process is performed by the data analytics application 150, although some or all of the operations in the process may be performed by other entities in other embodiments. In some embodiments, the operations in the process are performed in a different order and can include different and/or additional steps.

In some embodiments, the data analytics application 150 accesses 510 an analytics workflow. The analytics workflow comprises a sequence of tools. Each tool in the sequence is adapted to perform a data analytics function, such as input, output, preparation, join, predictive, spatial, investigation, parse, transform, and so on. The analytics workflow is a logic-controlled workflow and further includes one or more logic controllers.

The data received module 310 of the data analytics application 150 receives 510 a document to be analyzed. The document to be analyzed may be received as a data file (e.g., uploaded by a user of the data analytics application). The data file may be received as one of a set of supported document formats (e.g., PDF format). Moreover, the data received module 310 of the data analytics application 150 receives 515 a set of user provided key names to be extracted from the document. In some embodiments, the keys are received from the user of the data analytics application 150 through a graphical user interface provided by the user interface module 360 of the data analytics application.

The data analytics application 150 provides the document to the OCR module 320. The OCR module 320 of the data analytics application 150 identifies 520 a set of strings of characters (or text strings) within the document. In addition, the OCR module 320 may identify a location of each identified string of character. In some embodiments, the OCR module extracts the set of strings of characters from an image corresponding to the document. Moreover, the OCR module 320 may perform pre-processing to the document or the image of the document prior to extracting the set of strings of characters from the document.

The data analytics application 150 may provide the output of the OCR module 320 to the graph generation module 330. The graph generation module 330 of the data analytics application 150 generates 525 a document graph for the document based on the set of strings of characters extracted by the OCR module 320. The document graph may include a set of nodes (each corresponding to a string of characters of the set of strings of characters identified by the OCR module 320), and a set of edged (each edge connecting two or more nodes together).

The data analytics application 150 may then provide the document graph generated by the graph generation module 330 and the user provided key names to the key identification module 340. The key identification module 340 of the data analytics application 150 identifies 530 a set of keys in the document. The key identification module 340 may match each user provided key name to one or more nodes or node chains (i.e., set of nodes connected through a set of edges) in the document graph.

The data analytics application 150 may then provide the document and the keys identified by the key identification module 340 to the value identification module 350. In some embodiments, the data analytics application 150 additionally provides the document graph to the value identification module 350. The value identification module 350 of the data analytics application 150 identifies 535 a set of blocks of text within the document. In particular, the value identification module 350 may generate a set of bounding boxes, each surrounding one or more strings of characters within the document. To generate the bounding boxes, the value identification module 350 may deline the document, apply a RLSA, and apply a contour detection algorithm.

Moreover, the value identification module 350 of the data analytics application 150 extracts 540 values for each key from the identified blocks of text. In some embodiments, to extract the values, the value identification module 350 processes each of the identified bounding boxes and determines if one or more keys are located inside each of the bounding boxes. If more than one key is located inside a bounding box, the value identification model 350 splits the bounding box such that only one key is located inside each of the resulting bounding boxes. For each bounding box that includes only one key, the value identification module 350 extracts the value to be associated with the key located inside the bounding box from the text surrounded by the bounding box. Moreover, if a key is not located within a bounding box, the value identification module determines whether to associate the bounding box with a key.

Finally, based on the keys identified by the key identification module 340 and the values identified by the value identification module 350, a set of key-value pairs are generated 545. In some embodiments, the data analytics application 150 outputs the generated key value pairs to a user of the data analytics application. Alternatively, the data analytics application 150 may store the generated key-value pairs in a file or in a database connected to the data analytics application.

Figure 6:
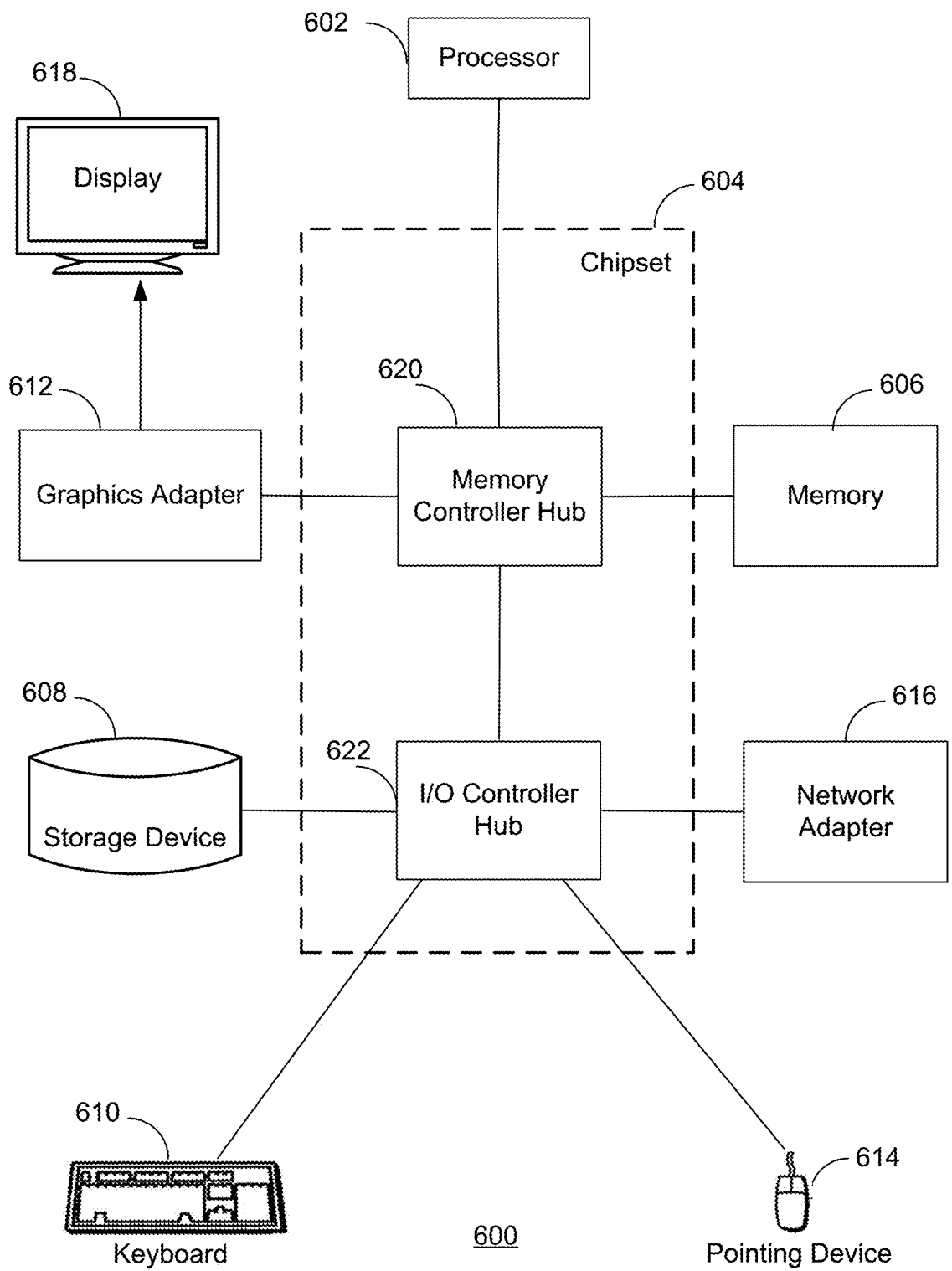
FIG. 6 is a high-level block diagram illustrating a functional view of a typical computer system for use as the data analytics system of FIG. 1 according to one embodiment.

FIG. 6 is a high-level block diagram illustrating a functional view of a typical computer system 600 for use as the machine learning server 110 of FIG. 1 according to one or more embodiments.

The illustrated computer system includes at least one processor 602 coupled to a chipset 604. The processor 602 can include multiple processor cores on the same die. The chipset 604 includes a memory controller hub 620 and an input/output (I/O) controller hub 622. A memory 606 and a graphics adapter 612 are coupled to the memory controller hub 620 and a display 618 is coupled to the graphics adapter 612. A storage device 608, keyboard 610, pointing device 614, and network adapter 616 may be coupled to the I/O controller hub 622. In some other embodiments, the computer system 600 may have additional, fewer, or different components and the components may be coupled differently. For example, embodiments of the computer system 600 may lack displays and/or keyboards. In addition, the computer system 600 may be instantiated as a rack-mounted blade server or as a cloud server instance in some embodiments.

The memory 606 holds instructions and data used by the processor 602. In some embodiments, the memory 606 is a random-access memory. The storage device 608 is a non-transitory computer-readable storage medium. The storage device 608 can be a HDD, SSD, or other types of non-transitory computer-readable storage medium. Data processed and analyzed by the machine learning server 110 can be stored in the memory 606 and/or the storage device 608.

The pointing device 614 may be a mouse, track ball, or other type of pointing device, and is used in combination with the keyboard 610 to input data into the computer system 600. The graphics adapter 612 displays images and other information on the display 618. In some embodiments, the display 618 includes a touch screen capability for receiving user input and selections. The network adapter 616 couples the computer system 600 to the network 160.

The computer system 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

We claim:

1. A method implemented by at least one computing device, the method comprising:
   receiving a document to be analyzed;
   receiving a set of key names to be extracted from the document;
   identifying a plurality of strings of characters contained within the document, and a location for each string of characters of the plurality of strings of characters;
   generating a document graph that includes:
      a set of nodes, each node of the set of nodes corresponding to a string of characters of the plurality of string of characters; and
      a set of edges that each connect two or more nodes of the set of nodes, the set of edges including an edge that connects a first node of the set of nodes to a second node of the set of nodes in response to the second node being within a threshold distance and within a threshold angle from the first node;
   identifying a set of keys based on the document graph and the received set of key names;
   extracting a set of values from the document; and
   generating a set of key-value pairs based on the set of keys and the set of values.

2. The method of claim 1, wherein identifying the plurality of strings of characters comprises performing optical character recognition (OCR) on the received document.

3. The method of claim 1, wherein identifying the set of keys based on the document graph and the received set of key names comprises:
   identifying a first node from the set of nodes of the document graph based on a first token of a key name, a string of characters corresponding to the first node matching the first token of the key name;
   identifying a second node from the set of nodes of the document graph based on a second token of the key name, the second node connected to the first node by an edge of the set of edges of the document graph, a string of characters corresponding to the second node matching the second token of the key name.

4. The method of claim 1, wherein extracting a set of values from the document comprises:
   delining the document to generate a delined document;
   applying a run length smearing algorithm (RLSA) to the delined document to identify a set of foreground pixels and a set of background pixels in the delined document;
   generating a set of bounding boxes based on the set of foreground pixels in the delined document; and
   extracting the set of values based on the generated set of bounding boxes.

5. The method of claim 4, wherein extracting the set of values based on the generated set of bounding boxes comprises:
   for each bounding box of the set of bounding boxes, determining a number of keys of the set of keys that are located within the bounding box;
   responsive to the number of keys being more than one, splitting the bounding box to generate a set of split bounding boxes, each split bounding box having one key of the set of keys located within the split bounding box.

6. A non-transitory computer-readable memory storing executable computer program instructions, the instructions executable to perform operations comprising:
   receiving a document to be analyzed;
   receiving a set of key names to be extracted from the document;
   identifying a plurality of strings of characters contained within the document, and a location for each string of characters of the plurality of strings of characters;
   generating a document graph that includes:
      a set of nodes, each node of the set of nodes corresponding to a string of characters of the plurality of string of characters; and
      a set of edges that each connect two or more nodes of the set of nodes, the set of edges including an edge that connects a first node of the set of nodes to a second node of the set of nodes in response to the second node being within a threshold distance and within a threshold angle from the first node;
   identifying a set of keys based on the document graph and the received set of key names;
   extracting a set of values from the document; and
   generating a set of key-value pairs based on the set of keys and the set of values.

7. The non-transitory computer-readable memory of claim 6, wherein identifying the plurality of strings of characters comprises performing optical character recognition (OCR) on the received document.

8. The non-transitory computer-readable memory of claim 6, wherein identifying the set of keys based on the document graph and the received set of key names comprises:

identifying a first node from the set of nodes of the document graph based on a first token of a key name, a string of characters corresponding to the first node matching the first token of the key name;

identifying a second node from the set of nodes of the document graph based on a second token of the key name, the second node connected to the first node by an edge of the set of edges of the document graph, a string of characters corresponding to the second node matching the second token of the key name.

9. The non-transitory computer-readable memory of claim 6, wherein extracting a set of values from the document comprises:

delining the document to generate a delined document;

applying a run length smearing algorithm (RLSA) to the delined document to identify a set of foreground pixels and a set of background pixels in the delined document;

generating a set of bounding boxes based on the set of foreground pixels in the delined document; and extracting the set of values based on the generated set of bounding boxes.

10. The non-transitory computer-readable memory of claim 9, wherein extracting the set of values based on the generated set of bounding boxes comprises:

for each bounding box of the set of bounding boxes, determining a number of keys of the set of keys that are located within the bounding box;

responsive to the number of keys being more than one, splitting the bounding box to generate a set of split bounding boxes, each split bounding box having one key of the set of keys located within the split bounding box.

11. A computer system, comprising:

a computer processor for executing computer program instructions; and a non-transitory computer-readable memory storing computer program instructions executable by the computer processor to perform operations comprising:

receiving a document to be analyzed;

receiving a set of key names to be extracted from the document;

identifying a plurality of strings of characters contained within the document, and a location for each string of characters of the plurality of strings of characters;

generating a document graph that includes:

a set of nodes, each node of the set of nodes corresponding to a string of characters of the plurality of string of characters; and a set of edges that each connect two or more nodes of the set of nodes, the set of edges including an edge that connects a first node of the set of nodes to a second node of the set of nodes in response to the second node being within a threshold distance and within a threshold angle from the first node;

identifying a set of keys based on the document graph and the received set of key names;

extracting a set of values from the document; and generating a set of key-value pairs based on the set of keys and the set of values.

12. The computer system of claim 11, wherein identifying the plurality of strings of characters comprises performing optical character recognition (OCR) on the received document.

13. The computer system of claim 11, wherein identifying the set of keys based on the document graph and the received set of key names comprises:

identifying a first node from the set of nodes of the document graph based on a first token of a key name, a string of characters corresponding to the first node matching the first token of the key name;

identifying a second node from the set of nodes of the document graph based on a second token of the key name, the second node connected to the first node by an edge of the set of edges of the document graph, a string of characters corresponding to the second node matching the second token of the key name.

14. The computer system of claim 11, wherein extracting a set of values from the document comprises:

delining the document to generate a delined document;

applying a run length smearing algorithm (RLSA) to the delined document to identify a set of foreground pixels and a set of background pixels in the delined document;

generating a set of bounding boxes based on the set of foreground pixels in the delined document; and extracting the set of values based on the generated set of bounding boxes.

15. The computer system of claim 14, wherein extracting the set of values based on the generated set of bounding boxes comprises:

for each bounding box of the set of bounding boxes, determining a number of keys of the set of keys that are located within the bounding box;

responsive to the number of keys being more than one, splitting the bounding box to generate a set of split bounding boxes, each split bounding box having one key of the set of keys located within the split bounding box.

16. The computer system of claim 14, the operations further comprising displaying a user interface, wherein receiving the set of key names to be extracted from the document is performed based on input to the user interface.

17. The computer system of claim 14, wherein receiving the document to be analyzed comprises receiving an image of the document to be analyzed, the operations further comprising converting the image to a predetermined resolution.

18. The method of claim 1, further comprising displaying a user interface, wherein receiving the set of key names to be extracted from the document is performed based on input to the user interface.

19. The method of claim 1, wherein receiving the document to be analyzed comprises receiving an image of the document to be analyzed, the method further comprising converting the image to a predetermined resolution.

20. The non-transitory computer-readable memory of claim 6, the operations further comprising displaying a user interface, wherein receiving the set of key names to be extracted from the document is performed based on input to the user interface.

* * * * *